(No Model.)
T. H. McCOLLIN.
APPARATUS FOR AND PROCESS OF MANUFACTURING PHOTOGRAPHIC EMULSIONS.
No. 263,053.  Patented Aug. 22, 1882.
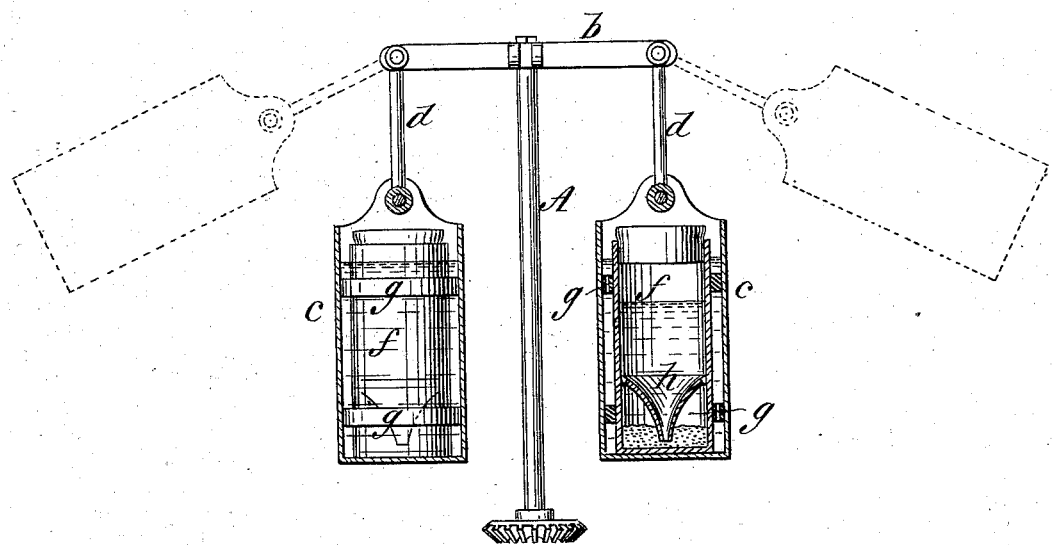
WITNESSES:
INVENTOR:

UNITED STATES PATENT OFFICE.

THOMAS H. McCOLLIN, OF PHILADELPHIA, PENNSYLVANIA.

APPARATUS FOR AND PROCESS OF MANUFACTURING PHOTOGRAPHIC EMULSIONS.

SPECIFICATION forming part of Letters Patent No. 263,053, dated August 22, 1882.

Application filed June 3, 1882. (No model.)

*To all whom it may concern:*

Be it known that I, THOMAS H. McCOLLIN, of the city and county of Philadelphia, Pennsylvania, have invented a new and Improved Apparatus and Process for the Manufacture of Photographic Emulsions, of which the following is a full, clear, and exact description.

In the preparation of photographic emulsions it is important to have the sensitive silver salts, after being formed in the presence of organic matters, thoroughly washed and separated from the organic matter present in order to incorporate them with fresh and unimpaired organic matter, such as gelatine, collodion, and other similar vehicles for carrying and holding the sensitive salts.

My invention consists in an apparatus and process for accomplishing this separation of organic matter by centrifugal action, as hereinafter described and claimed.

In the accompanying drawing I have shown a sectional elevation of apparatus for carrying out the said process.

The process is carried out as follows: If gelatine be used as the organic medium, in the presence of which the sensitive silver salt, such as bromide, iodide, chloride, and other salts, have been formed, I place the emulsions, which have been increased in bulk by the addition of water for the purpose of facilitating the separation of the particles of the sensitive silver salt from the liquid into a vessel or receiver which is fitted for revolution at a high speed, and so constructed that the liquid may pass away and the solid particles remain and settle at the bottom or sides of the vessel by the means of centrifugal force. The particles of silver salts remaining in the vessel are then to be collected and incorporated with fresh gelatine. If collodion be used in the place of or with gelatine, the thinning down to the proper condition may be accomplished by the addition of ether and alcohol instead of water. In revolving glass or other fragile vessels filled with liquids at high speed the interior pressure becomes greater than the exterior, and is liable to fracture the vessel containing the liquid. In order to overcome this difficulty, I provide the apparatus shown in the drawing.

A is an upright shaft, fitted for revolution at a high speed, and provided at its upper end with a cross-arm, *b*, from the ends of which are suspended the vessels *c c* by jointed links *d*. These vessels *c* are of strong material—such as wood, metal, or rubber—and within them are fitted interior vessels, *f*, of glass, which are held in place by rings *g*, of rubber or other elastic material, to prevent breakage of the glass by its contact with the other vessel. Within these vessels *f*, and near their lower ends, are fitted funnels *h*, which are for the purpose of preventing any remixing of the settled particles while decanting the liquid. The outer vessels, *c*, are to contain water or other liquids for the purpose of equalizing the pressure on the interior walls of the inside vessel.

The photographic emulsion is to be placed in the vessel *f*, and the shaft A being then revolved at high speed, the vessels are thrown out into the position shown by the dotted lines, and the particles of the sensitive silver salts are caused by their gravity to pass to the outer or lower ends of the inner vessel, *f*, through and beneath the funnels *h*. The liquid may then be decanted and the particles incorporated with a fresh medium. This treatment does not in any way injure the photographic qualities of the particles.

By this process I am enabled to collect the solid particles of the sensitive silver salts and combine them again with the same vehicle or one of a different kind.

Having thus described my invention, I claim as new and desire to secure by Letters Patent—

1. The process herein described of separating the solid particles from the liquid in photographic emulsions, consisting in placing the emulsions in suitable vessels provided with funnels arranged inside and at the lower ends of said vessels, and revolving the said vessels at high speed, whereby the solid particles will be deposited in the bottoms of the vessels, as set forth.

2. The combination of the outer vessel, *c*, and the inner vessel, *f*, of glass, retained in place by elastic holders, substantially as described, for use in the separation of photographic emulsions.

3. The combination, with the outer vessel, c, of the inner glass vessel, f, provided with the funnel h and the rubber bands g, substantially as and for the purpose set forth.

4. The combination, with the outer vessel, c, and the inner glass vessel, f, provided with the funnel h and the rubber bands g, of the shaft A, the cross-bar b, and the pivoted links d, substantially as and for the purpose set forth.

THOS. H. McCOLLIN.

Witnesses:
ALFRED CLEMENTS,
HENRY M. BOYD.